United States Patent [19]
Klaue

[11] Patent Number: 5,366,046
[45] Date of Patent: * Nov. 22, 1994

[54] FULL-LINING DISK BRAKE WITH HEAT DISSIPATION FEATURES

[76] Inventor: Hermann Klaue, Tour D'Ivoire, CH-1820 Montreux, Switzerland

[*] Notice: The portion of the term of this patent subsequent to Aug. 17, 2010 has been disclaimed.

[21] Appl. No.: 17,194

[22] Filed: Feb. 12, 1993

[30] Foreign Application Priority Data

Feb. 12, 1992 [DE] Germany ............... 4204139

[51] Int. Cl.⁵ ................................ F16D 65/78
[52] U.S. Cl. ................. 188/71.6; 188/264 A; 188/71.5
[58] Field of Search .......... 188/170, 18 A, 71.4, 188/71.5, 71.6, 106 A, 106 F, 264 A, 264 AA; 303/9.76, 71

[56] References Cited

U.S. PATENT DOCUMENTS

| | | | |
|---|---|---|---|
| 3,088,552 | 5/1963 | Christenson et al. | 188/106 F X |
| 3,770,085 | 11/1973 | Cottingham | 188/170 X |
| 4,564,242 | 1/1986 | Krude et al. | 188/264 AA X |
| 5,253,737 | 10/1993 | Klaue | 188/170 X |

FOREIGN PATENT DOCUMENTS

| | | | |
|---|---|---|---|
| 2736968 | 2/1979 | Germany | 188/71.4 |
| 3705911 | 9/1988 | Germany. | |

Primary Examiner—Robert J. Oberleitner
Assistant Examiner—Josie A. Ballato
Attorney, Agent, or Firm—Herbert Dubno

[57] ABSTRACT

To increase the life of brake linings especially for heavy-duty vehicles and to increase reliability, an operating brake which is directly actuated by compressed air and a blocking brake which is spring actuated and has a compressed air spring relief, both in full lining configuration, are provided in a housing having radial ribs and in heat conduction with the two brake units to convectively dissipate the heat to ambient air. The blocking brake is actuated for emergency downhill or like braking situations to contribute to the dynamic braking torque.

12 Claims, 3 Drawing Sheets

FULL-LINING DISK BRAKE WITH HEAT DISSIPATION FEATURES

FIELD OF THE INVENTION

My present invention relates to a full lining disk brake, especially for commercial vehicles having a gross weight of 14 metric tons or more and, more particularly, to a full lining disk brake for heavy duty vehicles which comprises a directly actuated, compressed air operated brake component or unit and a multidisk blocking brake component or unit with disks in friction pairings independent from the operating brake and with a force-storing spring for actuating a blocking brake but releasable by compressed air.

BACKGROUND OF THE INVENTION

Commercial and heavy-duty vehicles in the 14 ton class and higher have been predominantly equipped with drum-type brakes heretofore. In the United States, France and Germany, however, the front wheel brakes of this class of vehicles have been replaced to some extent by compressed air actuated mechanically operated segmental disk brakes but avoid problems which have arisen with drum-type brakes. Municipal busses, for example, have been primarily subject to this type of brake replacement in spite of the fact that the drawback of such segmental disk brakes is that they dissipate the braking heat primarily by radiation, by contrast to drum and full-lining brakes.

With segmental disk brakes, the heat conduction from the disk commences only when a temperature is attained which can significantly cause radiation. This may amount to 400° C. and thus the temperature range at which the segmental brake operates is that which coincides with very high brake-lining wear.

In municipal vehicles involved in city traffic, the brake linings generally can only last for about 10,000 kilometers and must be frequently replaced by comparison with normal highway travel which allows the brake linings to last for 30,000 to 40,000 kilometers.

Drum and full lining brakes can, however, be conveniently used for city travel because they, like clutch linings, show practically no wear because annular brake surfaces have an average temperature range which is below 100° C. in use.

The high wear of segmental disk brakes, releasing aramide fibers nowadays instead of asbestos fibers, nevertheless poses a heavy hazard and can affect the lungs of persons inhaling the fibers.

Thus, while segmental disk brakes have in the past been found to be desirable for heavy-duty vehicles to offset certain aspects of nonreliability of drum-type brakes, they have major disadvantages.

Full lining disk brakes, moreover, have become standard for tractors and tracked vehicles.

Indeed for commercial trucks and busses and heavy duty vehicles generally, a series of full lining disk brakes with mechanical and rod actuation have been proposed. However, direct pressure medium actuation is desirable for providing hysteresis-free antilocking operation.

OBJECTS OF THE INVENTION

It is, therefore, the principal object of the present invention to provide an improved full lining disk brake system with improved heat dissipation primarily by convection, low temperature operation and greater reliability.

Another object of this invention is to provide a disk brake system which is free from the drawbacks outlined above.

Still another object of the invention is to provide an improved full lining disk brake, especially for heavy-duty vehicles which can combine a blocking brake with a direct fluid-pressure-operated brake.

SUMMARY OF THE INVENTION

These objects are attained, in accordance with the present invention, in a full-lining brake system having a directly pressurized compressed air actuated operating brake and a multidisk blocking brake whose disks are in friction pairings independent of the operating brake component, are biased into engagement by a force-storing brake, and have a compressed air release of the spring actuation. The friction heat of the operating brake component A and that of the blocking brake component B are applied to an annular two-part radially ribbed brake housing and from the latter is dissipated to the ambient air predominantly by convection.

According to a feature of the invention, the friction lining carrying brake disks of the operating brake component A and the brake disks of the blocking brake component B are axially free to move upon the outer periphery of a one-piece or multipartite cylindrical brake carrier with which they are angularly entrained.

The flange side brake housing portion can be equipped with an inwardly-extending annular shoulder or formation with lamella friction surfaces cooperating with the stack of disks of the blocking brake.

The rotating brake lamella or disks of the blocking brake can be provided with radial bores which are juxtaposed on their inner sides with bores in the brake carrier and at their outer sides with bores in the brake housing.

According to another feature of the invention, the brake unit B forms an additional brake which can be applied when the operating brake A is actuated.

For deceleration and down-hill braking of the vehicle, the full operating medium pressure is applied to the operating brake A and for emergency braking during the deceleration or down-hill braking, I can utilize the full tire friction by a further depression of the foot brake actuator to operate the blocking brake unit B depending upon the foot pressure.

With high actuating speed upon full depression of the brake pedal, the brake components A and B both be actuated from the beginning of the brake operation.

The blocking brake thus can function as an operating brake in emergency situations calling for full braking.

The invention is particularly applicable to double-axle trucks of the highest load classifications.

More particularly, full-lining disk brake systems of the present invention can comprise:
- an annular metal two-part brake housing formed on an exterior thereof with radial ribs effecting dissipation of braking heat to ambient air;
- an operating disk brake component in the housing having at least one lined brake disk frictionally engageable directly with the housing to generate at least part of the braking heat by the frictional engagement therewith, and means responsive to compressed air for direct actuation of the brake disk of the operating disk brake;

a blocking brake component in the housing formed with a plurality of brake disks in friction pairs with at least one member of each pair in direct heat conducting relation with the housing to generate a remainder of the braking heat upon frictional engagement of the pairs, the blocking brake component further including force-storing spring means acting upon the brake disks of the blocking brake component to bias the friction pairs into mutual frictional engagement, and means responsive to compressed air effective to retain the force-storing spring means against biasing of the friction pairs into engagement until released, whereby friction heat of the operating disk brake component and friction heat of the blocking brake component are transferred to the housing and are thereby dissipated to ambient air predominantly by convection.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
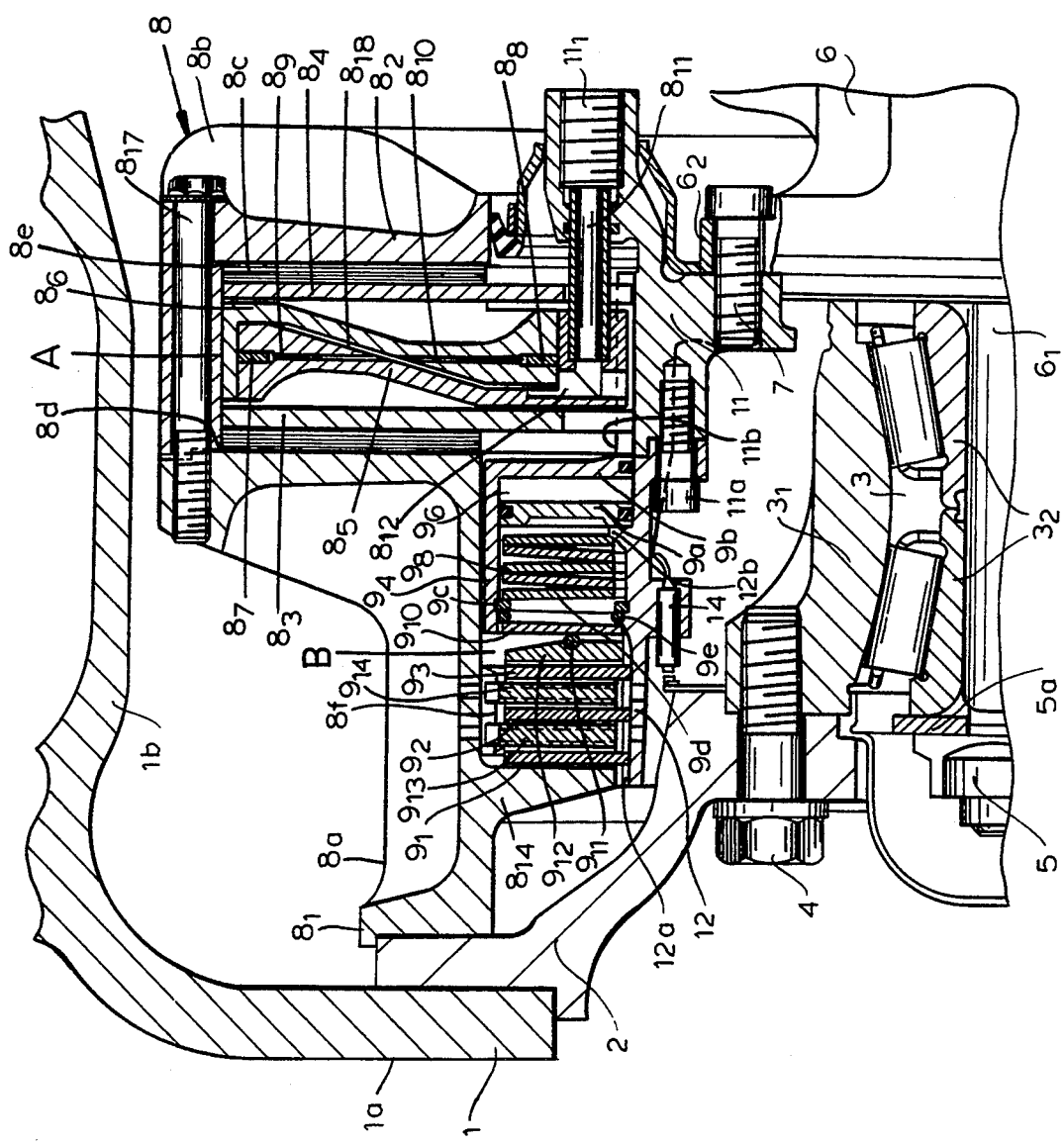
FIG. 1 is an axial cross sectional view in highly diagrammatic form illustrating a front wheel brake according to the invention.

In the drawing as described below, the same numerals have been used in connection with the two embodiments to describe similarly functioning and equivalent elements.

In FIG. 1, I have shown a wheel 1 which comprises the flange $1a$ connected to a rim $1b$ carrying a tire, not shown, and bolted to a hub 2 which, in turn, is connected to the outer ring or race $3_1$ of the wheel bearing 3 by bolts 4.

The inner race is a split ring $3_2$ which mounts the bearing on a pin $6_1$ of the front axle. A standard wheel nut 5 engages a washer $5a$ and is threaded onto the pin $6_1$ 1 to hold the inner race $3_2$ in place.

The axle 6 is formed with a flange $6_2$ which is connected by screws 7 to a two-part brake carrier, the parts of which are represented at 11 and 12 and are held together by screws $11a$. The operating brake A which is directly actuated by compressed air and the blocking brake B are mounted on this brake carrier 11, 12 along the cylindrical outer surfaces thereof.

Both brake units A and B transfer the heat resulting from braking directly to walls of a housing which is provided with radial ribs such as the ribs $8a$ on the outer side of the housing and the ribs $8b$ on the inner side of the housing for convective transfer of the heat to the ambient air.

Figure 2:
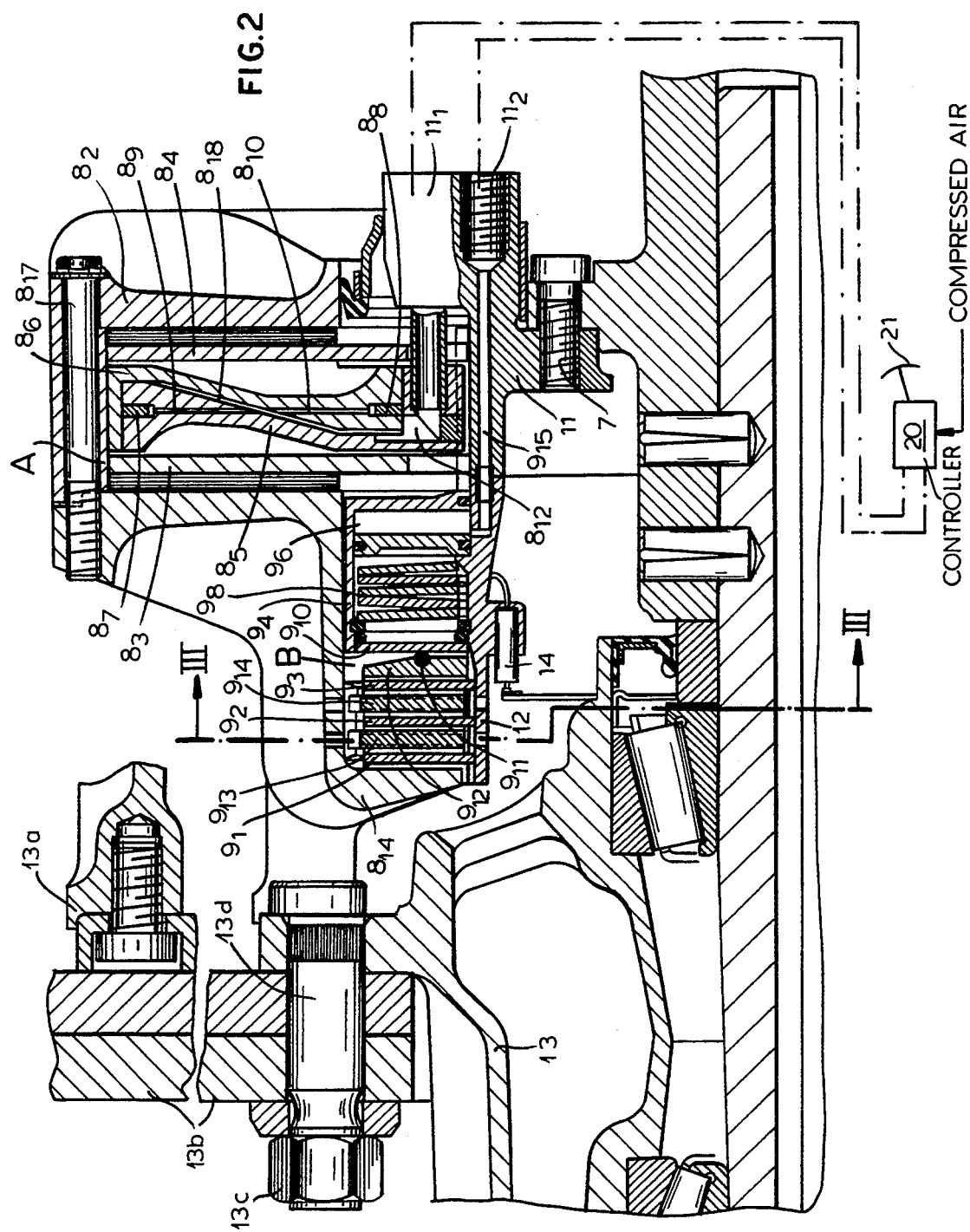
FIG. 2 is a cross sectional view similar to FIG. 1 but illustrating a portion of the rear axle and a rear wheel brake thereof.

The housing as a whole is represented at 8, is annular and surrounds and encloses both brake parts. The housing 8 is connected with the hub 2 of the front axis and the wheel body 13 of the rear axis (FIG. 2).

The housing 8 comprises two housing parts $8_1$ and $8_2$ held together by axially extending drawbolts $8_{17}$. The two braking units A and B have brake disks $8_3$ and $8_4$ provided with linings $8c$ and disks $9_1$–$9_3$ which can be provided with linings as well.

More particularly, for the operating brake A, the disks $8_3$ and $8_4$ are axially slidable on splines of the carrier part 11 and are angularly entrained therewith. Their linings $8c$ are directly juxtaposed with the surfaces $8d$ and $8e$ of the housing parts $8_1$ and $8_2$ to generate the friction heat therewith. The brake heat of the operating brake A, therefore, is thus generated directly at the housing wall and is transferred to the radial ribs directly.

The housing part $8_1$ has an inwardly-extending projection, shoulder for formation $8_{14}$ juxtaposed with one of the plates or disks $9_1$, $9_2$ and $9_3$ keyed on the splines $12a$ of the carrier part 12 so that these disks, which can be lined on both faces, move axially along the carrier 11, 12 but are angularly entrained therewith.

Figure 3:
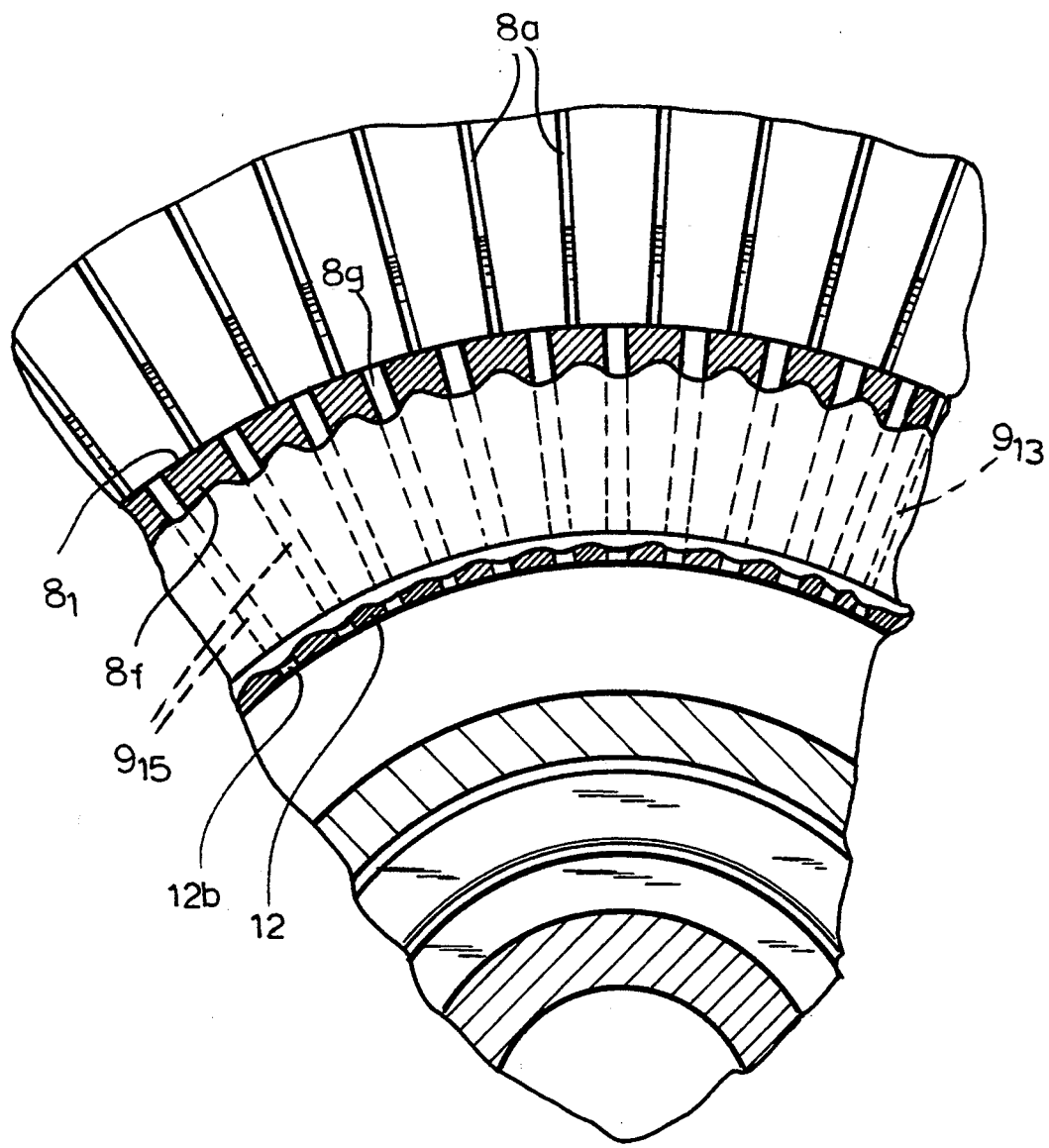
FIG. 3 is a cross sectional view taken generally along the line III—III of FIG. 2.

Between these plates or disks, (see FIG. 3) $9_1$, $9_2$, $9_3$ are the rotating plates, lamella or disks $9_{13}$ and $9_{14}$ which are keyed on splines $8f$ of the housing part $8_1$ so that these plates $9_{13}$ can move axially along the housing 8 but are rotatably entrained therewith.

The disks $9_{13}$ and $9_{14}$ are equipped with radial cooling bores $9_{15}$ which are radially aligned with bores $12b$ of the carrier and bores $8g$ of the housing to guide heat-carrying air traversing these bores into the ribbing of the housing where it is transferred to the ambient air by convection.

The operating brake A is constructed and functions as follows:

In the space provided within the two-part housing $8_1$, $8_2$ which rotates with the wheel, the two full-lining brake disks $8_3$ and $8_4$ are disposed with their linings rotated through 180° relative to one another. Between these disks are two rings $8_5$ and $8_6$ which are of Z configuration in an axial section and which interfit so that they together form a piston and cylinder assembly to which compressed air can be admitted from a tube $8_{11}$ axially movable in the threaded fitting $11_1$ of the brake carrier connected to the compressed air source.

When compressed air is fed between these rings, therefore, they are pressed apart and press the disks $8_3$ and $8_4$ against the walls $8d$ and $8e$ of the housing to frictionally retard rotation of the housing and the wheel relative to the carrier 11, 12 and the axle 6. For this purpose, a pressurized chamber $8_{18}$ is proved between the rings and is sealed by segmental sealing rings $8_7$, $8_8$.

Bores communicating pressure to the seals are shown at $8_9$ and $8_{10}$. The tube $8_{11}$ communicates with the bore $8_{12}$ which, in turn, communicates with pressurizable chamber $8_{18}$. Along the periphery of the rings $8_5$, $8_6$, automatic adjusting elements can be provided to compensate for lining wear and to maintain the usual brake play as is known in the braking art.

The construction and the function of the locking brake unit B is as follows:

This brake unit is biased by a force-storing spring and can also be used as an emergency brake to increase the braking torque. Usually, however, the pressurizable chamber $9_6$ is supplied by compressed air to load the spring and withdraw it from its actuation of the brake. More particularly, the pressurization of chamber $9_6$ braces the piston $9a$ against a bore $12b$ of the carrier 11, 12 while wall $9b$ of the actuating sleeve $9_4$ is displaced to the right, thereby drawing a ring $9c$ in the same direction and moving the outer periphery of a plate $9d$ to the right to compress the Belleville washer or dished disk spring stack $9_8$. This relieves the force on disk $9_{10}$ which is braced against a ring $9e$ and is fulcrumed on a ring $9_{11}$ to a plate $9_{12}$ against which the disk $9_3$ can bear.

When the pressure in chamber $9_6$ is released, the dished disk stack $9_8$ expands to bias the actuating disk $9_{10}$ and apply the brake.

The pressure in chamber $9_6$ can be relieved by a valve which forms part of the brake actuator 20 operated by the foot pedal 21 shown in FIG. 2. The disk $9_{10}$ represents a force multiplier which multiplies the force applied to disk $9_{12}$ in accordance with the ratio of the radius of the ring $9_{11}$ to the radius of the disk $9_{10}$.

A similar brake to that described in connection with FIG. 1 is illustrated in FIG. 2 and can be applied to the rear axle in which the wheel rim 13a is connected to flanges 13b attached by lug nuts 13c to the lug bolts 13d of the hub 13.

In both cases, the brake unit A can be dimensioned to provide a deceleration of 0.75 to 0.8 g at the standard pressure available in the compressed air system of the vehicle.

With comparatively small axial dimensions of the brakes of the invention, contrasting with commercially available mass-produced brakes, the predominant portion of the braking action is developed by the brake unit B. In downhill travel and at the usual highway speeds, the brake will operate well below 400° C. For emergency purposes, however, the brake unit B is available and actuation of the brake pedal 21 in the manner described, by fully stamping down on the brake, can release the blocking brake B to actuate the latter as well. The control 20 can be designed so that, upon high speed actuation of the brake pedal, both brake units will be actuated from inception of the braking operation.

For antiskid systems, each front and rear wheel brake carrier can be provided with a speed sensor 14 feeding the signal representing the speed to the processor and enabling the brake pressure of the brake unit A directly and the brake pressure of the brake unit B when it is actuated reciprocally to the actuating pressure to be regulated.

I claim:

1. A full-lining disk brake for a wheel of a commercial vehicle, comprising:
   an annular metal two-part brake housing formed on an exterior of the housing with radial ribs effecting dissipation of braking heat to ambient air;
   an operating disk brake component in said housing having at least one lined brake disk frictionally engageable directly with said housing to generate at least part of said braking heat by the frictional engagement therewith, and means responsive to compressed air for direct actuation of the brake disk of said operating disk brake component;
   a blocking brake component in said housing formed with a plurality of brake disks in friction pairs with at least one member of each pair in direct heat conducting relation with said housing to generate a remainder of said braking heat upon frictional engagement of said pairs, said blocking brake component further including force-storing spring means acting upon said brake disks of said blocking brake component to bias said friction pairs into mutual frictional engagement, and compressed-air-responsive means effective until released to retain said force-storing spring means against biasing of said friction pairs into engagement, whereby friction heat is transferred to said housing and dissipated to ambient air predominantly by convection.

2. The full-lining disk brake defined in claim 1, further comprising an axle on which said wheel is mounted, and cylindrical brake carrier mounted on said axle, said wheel being connected to said housing, said operating disk brake component comprising two lined brake disks respectively confronting opposite surfaces of said housing and keyed to said brake carrier for axial movement therealong while being angularly fixed to said carrier on an outer periphery thereof, said brake disks of said blocking brake component including brake disks keyed to said brake carrier for axial movement therealong while being angularly fixed to said carrier on said outer periphery thereof.

3. The full-lining disk brake defined in claim 2 wherein said housing at a side thereof connected to said wheel is formed with an inwardly extending annular shoulder formed a lamellar friction surface and adapted to have said brake disks of said blocking brake component braced thereagainst.

4. The full-lining disk brake defined in claim 3 wherein said brake disks of said blocking brake component keyed to said carrier are formed with radial bores and said housing and said carrier have throughgoing holes aligned with said bores.

5. The full-lining disk brake defined in claim 4, further comprising means for applying said blocking brake component while said operating brake component is applied to subject said wheel to combined braking of both components.

6. The full-lining disk brake defined in claim 5, further comprising means whereby in for deceleration and downhill travel exclusively the operating brake component is operated with up to full brake medium pressure, and during the deceleration and downhill travel emergency braking is effected through utilization of a full tire friction by pressing further on a foot pedal and foot brake actuation of the blocking brake component as a function of foot pressure.

7. The full-lining disk brake according to claim 5, further comprising means responsive to high speed brake actuation of a brake pedal for joint actuation of both brake components.

8. The full-lining disk brake defined in claim 1 wherein said housing at a side thereof connected to said wheel is formed with an inwardly extending annular shoulder formed a lamellar friction surface and adapted to have said brake disks of said blocking brake component braced thereagainst.

9. The full-lining disk brake defined in claim 1 wherein said brake disks of said blocking brake component keyed to said carrier are formed with radial bores and said housing and said carrier have throughgoing holes aligned with said bores.

10. The full-lining disk brake defined in claim 1, further comprising means for applying said blocking brake component while said operating brake component is applied to subject said wheel to combined braking of both components.

11. The full-lining disk brake defined in claim 1, further comprising means whereby in for deceleration and downhill travel exclusively the operating brake component is operated with up to full brake medium pressure, and during the deceleration and downhill travel emergency braking is effected through utilization of a full tire friction by pressing further on a foot pedal and foot brake actuation of the blocking brake component as a function of foot pressure.

12. The full-lining disk brake according to claim 1, further comprising means responsive to high speed brake actuation of a brake pedal for joint actuation of both brake components.

* * * * *